United States Patent [19]

Elhaus

[11] 4,214,493
[45] Jul. 29, 1980

[54] CIRCULAR SAW

[76] Inventor: Friedrich W. Elhaus, Hofkamp 140, D-5600 Wuppertal 1, Fed. Rep. of Germany

[21] Appl. No.: 877,919

[22] Filed: Feb. 15, 1978

[30] Foreign Application Priority Data

Feb. 15, 1977 [DE] Fed. Rep. of Germany ....... 2706336

[51] Int. Cl.³ ...................... B23D 47/02; B23D 47/10; B27B 5/18
[52] U.S. Cl. .................................... 83/100; 83/471.2; 83/486; 83/488; 83/452; 83/614; 83/478; 83/544
[58] Field of Search ..................... 83/100, 471.2, 471.3, 83/486, 486.1, 488, 544, 614, 478, 452

[56] References Cited

U.S. PATENT DOCUMENTS

| 1,866,888 | 7/1932 | Hawley | 83/471.3 |
| 2,870,801 | 1/1959 | Cravens | 83/486.1 |
| 2,987,085 | 6/1961 | Porter | 83/100 |
| 3,207,019 | 9/1965 | Vanzo et al. | 83/488 X |
| 3,747,457 | 7/1973 | Thompson | 83/488 X |
| 4,036,093 | 7/1977 | Thorsell | 83/471.3 |
| 4,054,072 | 10/1977 | Jagers | 83/488 |

FOREIGN PATENT DOCUMENTS 2035050 6/1973 Fed. Rep. of Germany .
2631767 2/1977 Fed. Rep. of Germany .
1366911 6/1964 France .

Primary Examiner—Donald R. Schran
Attorney, Agent, or Firm—Gary M. Ropski

[57] ABSTRACT

A circular saw, the saw blade of which is adapted to be moved horizontally across a table at a horizontally movable carriage or slide and to be lifted into a position above the material to be sawed comprises a horizontal cantilever beam one end of which is guided by a vertical guide means at a single vertical support member and the other end of which is unsupported and therefore offers free access for handling of the material to be sawed or sawed, respectively, and for controlling the saw movements from a space adjacent said other end.

12 Claims, 5 Drawing Figures

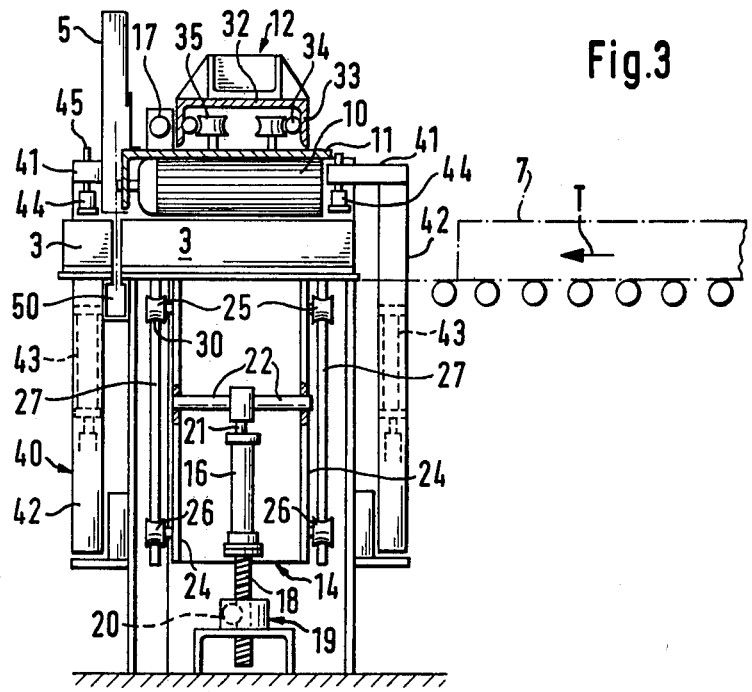
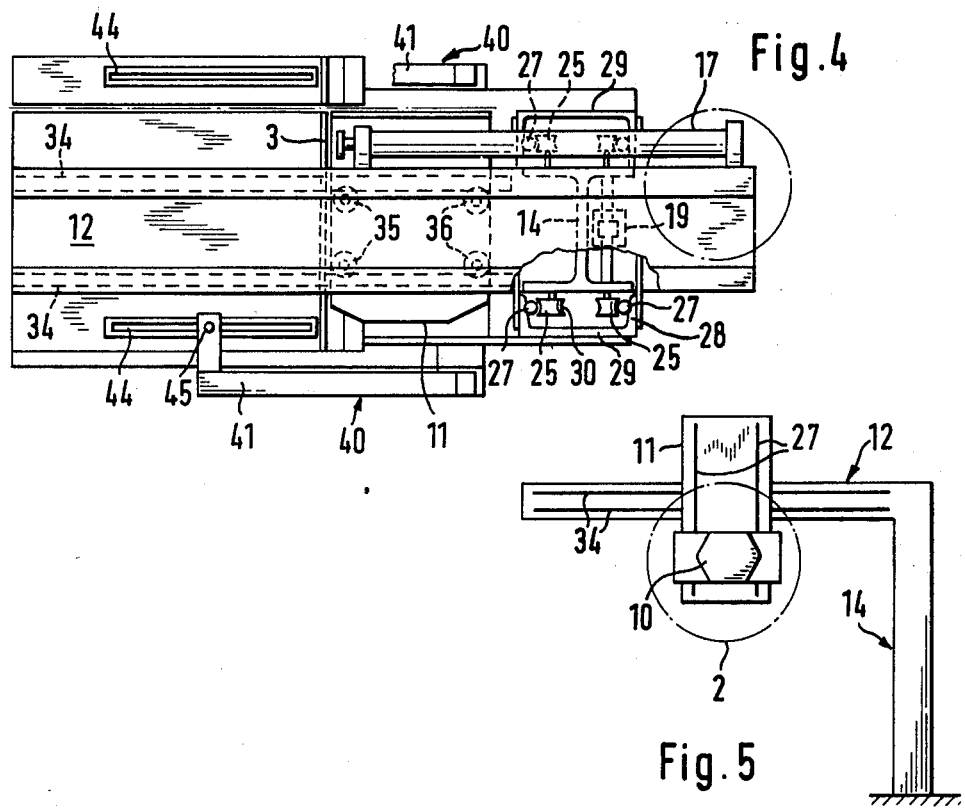

CIRCULAR SAW

The invention relates to a circular saw, in particular for sawing bars or billets of light metal, such as aluminium, the saw blade of which is adapted to be moved horizontally across a table at a carriage or slide and to be lifted into a position above the material to be sawed, the carriage or slide being displaceable along a horizontal guide means.

In a known circular saw of this kind (German Application Print 2 035 050) the saw slide is disposed on a horizontal guide beam adapted be be lifted along vertical guide columns by support bearings provided at both its ends with the aid of lifting cylinders operating under synchronized control. This design is complicated and expensive. The table hardly offers access in the area of the circular saw.

In a further known circular saw (German Patent Application Print No. 26 31 767) a horizontal cantilever beam which carriers and horizontally guides the carriage or slide of the saw may be adjusted by hand in different vertical positions at a vertical support member using a screw spindle for the adjustment istself and an additional clamping screw for fixing the adjusted position at the vertical support member. This does not allow for a lifting and lowering of the saw in use during each sawing step.

Another known construction provides for a protective hood covering the saw blade (French patent No. 1 366 911).

It is an object of the invention to provide a circular saw which overcomes the disadvantages mentioned.

It is a further object of the invention to provide a circular saw which permits quick sawing by allowing controlled horizontal and lifting or lowering movement of the saw blade during each sawing step.

Still another object of the invention is to provide a circular saw which offers good access to a worker and at the same time protecting the worker from being injured by the saw blade.

A further object of the invention is to provide a circular saw of simple structure.

According to the invention it is provided that the horizontal guide means is disposed at a horizontal cantilever beam, one end of which is guided by a vertical guide means at a single vertical support member which is fixed at least in lifting direction, and the other end of which is unsupported and offers free access for handling of the material sawed or to be sawed, respectively, and for controlling the saw from the space adjacent of said other end.

According to a further aspect of the invention the horizontal guide means is arranged at a horizontal cantilever beam of a support structure including a vertical column which is fixed at least in lifting direction, the cantilever beam being connected rigidly to said column, and a guide means for the lifting movement of the saw blade is provided at the slide or carriage.

The invention provides an improvement of the accessibility of the saw by virtue of the cantilever beam construction since the operating side can be located at the free end of the horizontal cantilever beam. At the same time the lifting movement and its guidance are facilitated, as compared to the known circular saw, because both embodiments of the invention require only one drive means for the lifting movement instead of two drives controlled in synchronism, and only one guide means for the lifting movement.

In accordance with a further aspect of the invention the guidance of the lifting movement preferably is also designed similar to the horizontal guide means and is embodied in particular in the form of a rectilinear roller guide means. However, it is obvious that the lifting movement may also be generated by pivoting movement of the saw blade with sawing drive relative to the slide.

In accordance with the invention the lifting movement and the horizontal movement may either be effected separately or at the same time.

The drives of the longitudinal movement and of the lifting movements conveniently are realized by separate pressure fluid cylinders. A basic adjustment of the lifting movement can be obtained in simple manner by connecting the pressure fluid cylinder for the lifting movement to an element which is adjustable in height, such as the spindle of a height adjustment device, for example, a worm drive adapted to be driven by a hand wheel.

With the circular saw according to the invention the saw blade automatically generates a force which presses the material to be sawed against the surface of the table and against the abutment. And yet at least one additional hold down device is provided for safety considerations. It is adapted to be pressed against the material being cut by means of its own pressure fluid cylinder, independently of the lifting movement of the saw blade. This is preferred over a likewise conceivable arrangement with which the hold down device is mounted on the carrier which is raised and lowered because in that case the hold down effect would be cancelled upon lifting of the saw blade, an effect not always desired.

An important contribution toward increased saftey of the circular saw according to the invention resides in the fact that a fixed protective hood covering the saw blade in its lowered as well as in its raised operating positions is mounted on the table or its support.

The circular saw according to the invention may also be designed as a so-called "flying saw" which means that the otherwise fixed members, such as table and support elements are movable together with the material to be sawed at the advance speed thereof.

The invention will be described further, by way of example, with reference to the accompanying drawings, in which:

FIG. 3 is a front elevational view of a circular saw according to the invention, as seen from the operating side and with parts broken away or in section;

FIG. 4 is a top plan view of a circular saw according to the invention, with parts broken away or in section;

FIG. 5 is a diagrammatic view of a modified embodiment of a saw according to the invention.

Figure 1:
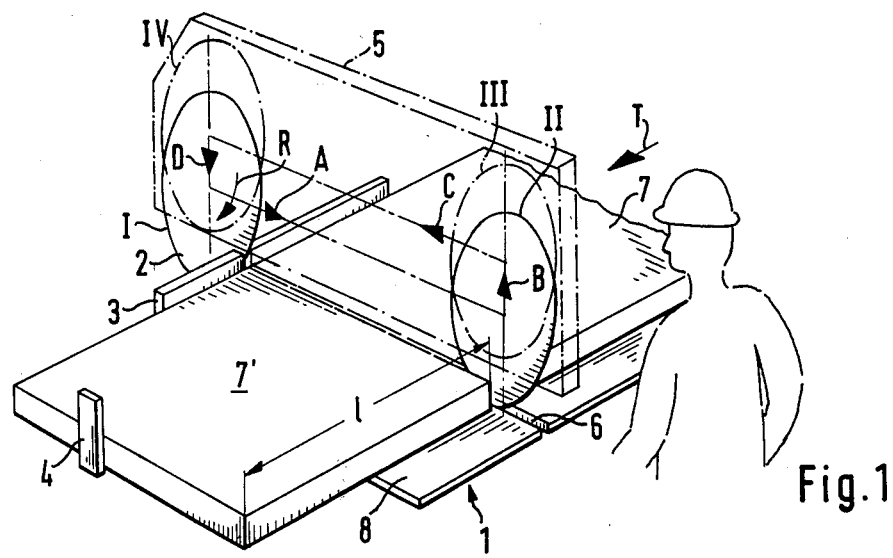
FIG. 1 is an operational diagram of a circular saw in accordance with the invention.

Of the circular saw only the table 1, the saw blade 2 in four positions I, II, III, and IV, a longitudinal abutment member 3, a crosscut stop member 4, and in phantom outline (discontinuous lines) a protective hood 5 are shown in the perspective diagrammatic view of FIG. 1. Furthermore, an elongated slot 6 may be seen in the table. During the cutting process the lower edge of the saw blade 2 enters into this slot. The material to be sawed is marked by reference numeral 7.

With reference to FIG. 1 it will now be described how the novel circular saw is put to work:

Upon infeed of the material to be sawed, in the direction of arrow T, and aligning against abutment member 3 and stop member 4 the saw blade is caused to rotate in the direction of arrow R and is moved in translatory sense from its rest position I in the direction of arrow A parallel to the table top 8. During its movement the saw blade 2 completely severs the material 7 to be sawed because the lower edge of the saw blade is disposed somewhat deeper than the underside of the material 7 to be sawed since it is immersed in slot 6. The sawing process is continued until saw blade 2 has reached position II. Then the material 7 to be sawed is fully severed and, for instance, cut to a length 1 which is predetermined by the position of the adjustable crosscut stop member 4. Subsequently saw blade 2 is moved vertically upwards in the direction of arrow B into an elevated position III, in which position the lower edge of the saw blade is free of the surface of the workpiece or material 7. At this height or elevation the saw blade 2 is again moved in translatory sense parallel to the table surface from position III into a position Iv which is located beyond the longitudinal abutment member 3, as seen from the operator's place shown diagrammatically in FIG. 1. During this return motion the operator can remove the cut-off part 7' of the material 7 and align new material on table 1 to be cut subsequently. It will be appreciated that the saw blade is fully covered by protective hood 5, particularly during the return motion (arrow C), so that optimum accident protection of the operator is obtained when he carries out his work under the protective hood 5.

The saw blade is then lowered in the direction of arrow D from position IV into the rest position I in which it is ready for further operation.

Figure 2:
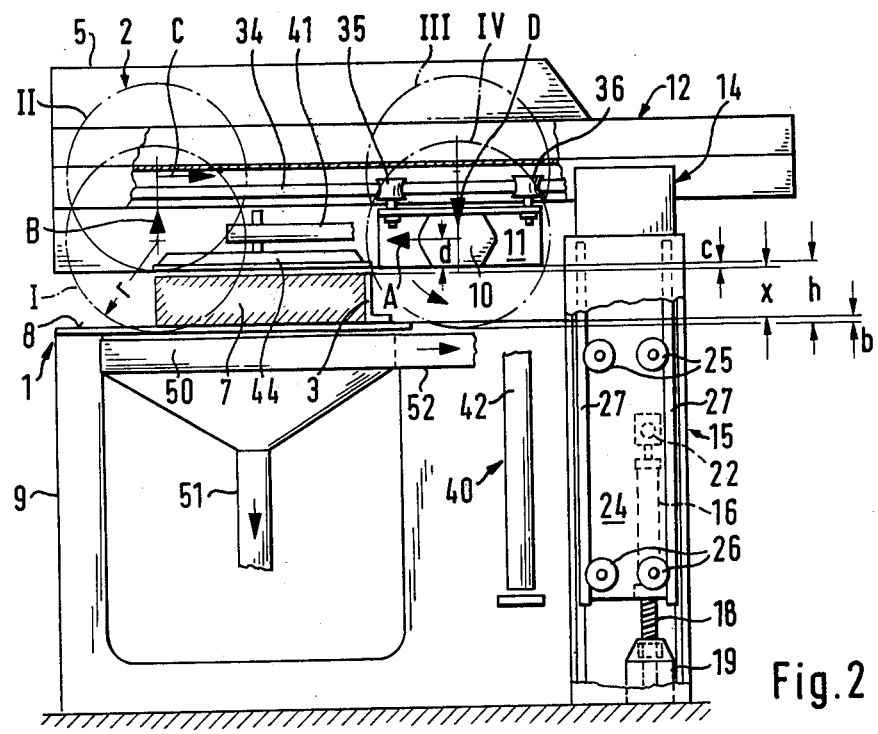
FIG. 2 is a side elevational view of a circular saw according to the invention, with parts shown broken away or in section.

The embodiment now to be described with reference to FIGS. 2 to 4 is a preferred, particularly elegant realization of extremely simple structure of the circular saw, the operation of which was explained above with reference to FIG. 1. For the sake of simplicity the same reference numerals are used for corresponding elements.

The circular saw shown in FIGS. 2 to 4 again comprises a table 1 with a table top 8 and support 9 and an elongated slot 6, a saw blade 2 entering into said slot upon sawing and being shown in discontinuous lines in FIG. 2 in its four positions I to IV, a longitudinal abutment member 3 for the material 7 to be sawed, and a stationary protective hood 5 which completely covers the saw blade in its raised positions III, IV.

In FIG. 2 the place of the operator indicated in FIG. 1 is at the left side. It will be appreciated that the operator has free access to the table top 8 and to the material 7 to be sawed without being unnecessarily exposed to any danger from the saw blade which is largely covered by the protective hood 5 during operation as well. The good accessibility, among others, is afforded by the cantilever type structure of the saw support means which is open towards the operator's side and will be described in more detail below.

It may be gathered from FIGS. 2 and 3 that the drive motor 10 of the saw blade is arranged coaxially with the saw blade and that the sawing unit composed of drive motor 10 and saw blade 2 is supported on a horizontally movable carriage 11. The stroke or height of lift by which the saw blade 2 is to be raised above the surface of the table results from the following equation:

$$h = x + c + b$$

wherein h=height of lift, x=maximum sawing depth (or thickness of the material being cut), c=a minor clearance of motion between the underside of the drive motor 10 and the surface of the material to be sawed, b=the depth of immersion of the saw blade 2 below the surface of the table.

The radius of the saw blade 2 is determined according to the following equation:

$$r = h + d$$

wherein d=the motor radius in vertical, downwardly oriented direction. The useful portion h of the saw blade radius r is as large as can be and much greater, for instance, than with a saw having its saw blade arranged under the table.

The circular saw shown in the figures comprises a horizontal cantilever beam 12 along which the carriage 11 is horizontally movable together with the sawing unit 2, 10. This permits generation of the movements in the direction of arrows A and C. The cantilever beam 12 is firmly connected to a column 14 which in turn is vertically displaceable in a support member 15. This permits generation of the movements of the saw blade in the direction of arrows B and D. In both cases pressure fluid cylinders are employed to produce the movements, one pressure fluid cylinder 16 generating the vertical movements and one pressure fluid cylinder 17 (FIGS. 3 and 4) generating the horizontal movements of the saw blade 2. The foot of cylinder 16 is firmly connected to the spindle 18 of a worm drive 19 provided with a driving worm 20. Rotation of the worm 20 by means of a handwheel (not shown) permits adjustment of the basic level of the hydraulic cylinder 16 and thus of column 14 to a desired value. As shown particularly in FIG. 3, the piston rod 21 of cylinder 16 engages column 14, designed as a I-beam, by way of a transverse bar 22. Roller pairs comprising upper rollers 25 and lower rollers 26 are rotatably supported at two different heights on the legs 24 of column 14. The corresponding guide rails are formed by round rods 27 fixed at the inner sides of legs 28 of oppositely arranged U-shaped profiles 29 of support member 15. The rollers 25, 26 have rounded recesses 30 to adapt them to the rods 27.

Also cantilever beam 12 is made from sectional material and in particular has a U-shaped profile 32 with its opening oriented downwards, round rods 34 being secured to the inner sides of its legs 33 in the same manner as with the guide means of column 14. The rods 34 serve as rails for roller pairs comprising front rollers 35 and rear rollers 36 of carriage 11.

The guide structure described above is of simple design and permits noiseless and maintenance-free guidance of low wear of column 14 inside support member 15 and of a carriage 11 in cantilever beam 12.

The circular saw shown comprises another structural group embodied by two devices for holding down the material to be sawed. They each comprise a pivotable angular bracket 40 shaped like a gallows. For the sake of clarity FIG. 2 shows only parts of the horizontal leg 41 and of the vertical leg 42 of said bracket. Each angular bracket is adapted to be raised and lowered by means of a pneumatic lifting cylinder 43 (FIG. 3). At the free end of the horizontal leg 41 a hold down jaw 44 is arranged so as to be adjustable in height by means of a guide bar 45 which is secured against rotation.

It will be appreciated that because of their independent drive the hold down devices are operable completely independently of the saw blade movement, especially the lifting movement of the saw blade. However, it is also possible to couple the operation of the hold down devices with the lifting movement of the cantilever beam 12, for example, in such manner that the cylinders 43 are operated automatically to lift the hold down jaws 44 and thus release the material 7 being sawed when the saw blade 2 has reached a certain position, such as position II after cutting.

Another feature of the circular saw shown resides in a chip suction device disposed under the table adjacent the work path of the saw and comprising a chip suction channel 50 as well as chip discharge passages 51 and 52. These discharge passages communicate with a ventilator (not shown) and a cyclone separator (likewise not shown).

The saw as illustrated operates safely and silently as described in connection with FIG. 1. The sawing time is reduced by the period of time required for the return movement of the saw blade 2 from position III into position I because during that period of time the operator can carry out other work, such as removing the material cut to the desired length and arranging new material to be cut in preparation of the next sawing cycle.

In the embodiment according to FIG. 5, in which the same reference numerals are used for elements corresponding to those of FIGS. 1 to 4, the vertical column 14 of the cantilever beam 12 is supported stationarily, thus providing increased rigidity of the structure. Whereas in this case, too, horizontal guide rails 34 are arranged at the cantilever beam 12 to guide the slide or carriage 11 along the cantilever beam 12, vertical guide rails 27 are provided at the carriage 11. The sawing unit composed of drive motor and saw blade 2 is vertically displaceable along these guide rails, for instance, by means of a pressure fluid cylinder (not shown) which acts between the carriage 11 and the sawing unit. To realize a "flying saw" one should take support member 15 of FIG. 2 or column 14 of FIG. 5 as being movable in a direction vertical to the plane of the drawing, i.e. in the infeed direction of the material to be sawed at a speed corresponding to the advance speed of the material being sawed, instead of being stationary.

Though the above-described embodiments are preferred, many other modifications and refinements which do not depart from the true spirit and scope of the invention may be conceived by those or ordinary skill in the art. It is intended that all such modifications and refinements be covered by the following claims.

What is claimed is:

1. A circular saw for industrial use in sawing elongated bars or billets of metallic material comprising:
    a rotatable saw blade;
    means attached to said saw blade, for guiding said saw blade horizontally, said horizontal guide means being positioned on a cantilevered beam element;
    means for vertically guiding said cantilevered beam element, said vertical guide means engaging a vertical support member and one end of said cantilevered beam element, whereby the other end of said cantilevered beam element is unsupported, thereby providing free access for handling the material and for controlling saw movement from an area adjacent said other end of said cantilevered beam element;
    automatic drive means for movement of said saw blade horizontally along said horizontal guide means and for movement of said cantilevered beam element vertically along said vertical guide means in a predetermined sequence of horizontal and vertical movements.

2. The circular saw of claim 1 wherein the sequence of movements includes movement of said saw blade horizontally such that a lower edge of said saw blade is disposed somewhat deeper than the underside of the material to be sawed, movement of said cantilevered element and said saw blade vertically upward to an elevated position above the material to be sawed, movement of said saw blade horizontally in a direction opposite to the first movement to a position beyond an edge of the material to be sawed, and movement of said cantilevered element and said saw blade vertically downwardly to a position in which the lower edge of said saw blade is again disposed somewhat deeper than the underside of the material to be sawed.

3. The circular saw of claim 1 wherein said cantilevered beam element includes a horizontal beam rigidly connected to a vertical column, said vertical guide means engaging said vertical column and said vertical support means.

4. The circular saw of claim 1 wherein said horizontal guide means and said vertical guide means each includes roller guide means.

5. The circular saw of claim 4 wherein at least one roller guide means includes circular cross-section rods attached to the inner surface of at least one of the guide means and rollers having recessed running surfaces substantially conforming to the curvature of the rods.

6. The circular saw of claim 1 wherein said means for moving the cantilevered beam element is a pressure cylinder and said means for moving the saw blade is a pressure cylinder.

7. The circular saw of claim 6 wherein said pressure cylinder for moving the cantilevered beam element is supported on a means for adjusting the stroke of said pressure cylinder.

8. The circular saw of claim 7 wherein said stroke adjusting means includes a worm drive having a spindle.

9. The circular saw of claim 1 further comprising means for clamping said material to be sawed to a material support means, said clamping means including a fluid pressure cylinder adapted to operate independently of said means for moving the cantilevered beam element, an angular bracket attached to said material support means, and a clamping jaw adjustably suspended from said bracket.

10. The circular saw of claim 1 further comprising a protective hood for said saw blade.

11. The circular saw of claim 1 further comprising a chip suction means arranged along the horizontal path of the saw blade.

12. The circular saw of claim 11 wherein the chip suction means includes a chip suction channel and chip suction passage operatively connected therewith.

* * * * *

UNITED STATES PATENT AND TRADEMARK OFFICE
CERTIFICATE OF CORRECTION

PATENT NO. : 4,214,493
DATED : July 29, 1980
INVENTOR(S) : Friedrich W. Elhaus

It is certified that error appears in the above-identified patent and that said Letters Patent are hereby corrected as shown below:

Column 1, line 13, please delete "be" and substitute therefor --to--;

Column 1, line 24, please delete "istself" and substitute therefor --itself--;

Column 2, line 36, please delete "saftey" and substitute therefor --safety--;

Column 3, line 25, please delete "Iv" and substitute therefor --IV--;

Column 5, line 1, please delete "the" and substitute therefor --each--;

Column 5, line 53, please delete "or" and substitute therefor --of--;

Signed and Sealed this

Tenth Day of March 1981

[SEAL]

Attest:

RENE D. TEGTMEYER

*Attesting Officer*   *Acting Commissioner of Patents and Trademarks*